(12) United States Patent
Voecks

(10) Patent No.: US 12,129,186 B2
(45) Date of Patent: *Oct. 29, 2024

(54) FLUID DECONTAMINATION APPARATUS

(71) Applicant: Pontic Technology, LLC, Seal Beach, CA (US)

(72) Inventor: Gerald Voecks, La Crescenta, CA (US)

(73) Assignee: Pontic Technology, LLC

( * ) Notice: Subject to any disclaimer, the term of this patent is extended or adjusted under 35 U.S.C. 154(b) by 0 days.

This patent is subject to a terminal disclaimer.

(21) Appl. No.: 16/912,151

(22) Filed: Jun. 25, 2020

(65) Prior Publication Data
US 2020/0399140 A1    Dec. 24, 2020

Related U.S. Application Data

(63) Continuation of application No. 16/192,745, filed on Nov. 15, 2018, now Pat. No. 10,710,897.
(Continued)

(51) Int. Cl.
*C02F 1/00* (2023.01)
*B01D 46/00* (2022.01)
(Continued)

(52) U.S. Cl.
CPC .......... *C02F 1/001* (2013.01); *B01D 46/0002* (2013.01); *B01D 46/0054* (2013.01);
(Continued)

(58) Field of Classification Search
CPC .... C02F 1/001; C02F 1/72; C02F 1/46; C02F 1/32; C02F 1/36; C02F 1/30; C02F 1/48; B01D 46/00; B01F 5/06
See application file for complete search history.

(56) References Cited

U.S. PATENT DOCUMENTS 6,200,486 B1 * 3/2001 Chahine ................. C02F 1/34
  210/764
7,135,155 B1 * 11/2006 Long, Jr. ............... B01J 19/008
  422/224
(Continued)

FOREIGN PATENT DOCUMENTS

CN    102531146 A    *    7/2012
CN    106348425 A         1/2017
(Continued)

OTHER PUBLICATIONS

CN 102531146 A-translation (Year: 2012).*

*Primary Examiner* — Walter D. Griffin
*Assistant Examiner* — Cameron J Allen
(74) *Attorney, Agent, or Firm* — Schlee IP International, PC; Alexander R. Schlee; Pascal A. Schlee

(57) ABSTRACT

A fluid decontamination apparatus is provided having a container body with a plurality of three-dimensional open structure (3DOS) substrates spaced about therein, wherein a contaminated fluid flowing through the container body will contact the 3DOS substrates. Nozzles can be inserted and secured within inlet apertures disposed about the container body, configured to inject the contaminated fluid with/without air to induce the occurrence of hydrodynamic cavitation. The substrates can be porous and permeable enabling the contaminated fluid to flow therethrough, wherein the fluid flow passageway through the pores extends the volume of contaminated fluid exposed to turbulent and cavitation inducing flow conditions. Moreover, the 3DOS substrates may be coated with one or more types of catalysts so as to initiate chemical reactions. As such, the extended exposure (Continued)

of the contaminated fluid to hydrodynamic cavitation forming conditions, along with the chemical reactions carried out on the porous surfaces, enable an increased number of toxic species and unwanted organic compounds to be destroyed and/or altered, thereby enhancing the decontamination of the flowing fluid.

20 Claims, 10 Drawing Sheets

Related U.S. Application Data

(60) Provisional application No. 62/587,043, filed on Nov. 16, 2017, provisional application No. 62/641,677, filed on Mar. 12, 2018.

(51) Int. Cl.
  *C02F 1/32* (2023.01)
  *C02F 1/36* (2023.01)
  *C02F 1/72* (2023.01)
  *B01F 25/452* (2022.01)
  *C02F 101/30* (2006.01)

(52) U.S. Cl.
  CPC ............... *C02F 1/325* (2013.01); *C02F 1/36* (2013.01); *C02F 1/725* (2013.01); *B01F 25/4524* (2022.01); *C02F 2101/30* (2013.01); *C02F 2201/002* (2013.01); *C02F 2201/3227* (2013.01); *C02F 2301/02* (2013.01); *C02F 2301/06* (2013.01); *C02F 2301/10* (2013.01)

(56) References Cited

U.S. PATENT DOCUMENTS

| | | | | |
|---|---|---|---|---|
| 2008/0094937 | A1* | 4/2008 | Li | B01F 33/30 366/177.1 |
| 2013/0248429 | A1* | 9/2013 | Dahule | C02F 1/34 210/150 |
| 2016/0045841 | A1* | 2/2016 | Kaplan | B01D 53/48 429/49 |
| 2017/0320754 | A1 | 11/2017 | Henderson et al. | |

FOREIGN PATENT DOCUMENTS

| | | |
|---|---|---|
| DE | 19842160 A1 | 3/2000 |
| WO | 2011/125427 A1 | 10/2011 |

* cited by examiner

FLUID DECONTAMINATION APPARATUS

CROSS REFERENCE TO RELATED APPLICATION

This application is a continuation application of U.S. patent application Ser. No. 16/192,745, filed Nov. 15, 2018, which claims the benefit of U.S. Provisional App. No. 62/587,043, filed Nov. 16, 2017, and U.S. Provisional App. No. 62/641,677, filed Mar. 12, 2018, all of which are incorporated by reference.

FIELD OF THE INVENTION

The present invention relates generally to fluid decontamination and, more particularly, to the use of three dimensionally open structured material to enhance existing fluid decontamination methods.

BACKGROUND OF THE INVENTION

Fluids, particularly liquids such as water, are susceptible to being contaminated with toxic species and other unwanted organic compounds. As such, there are several methods used in various industries to decontaminate and treat such contaminated fluids. These methods include sonication, hydrodynamic cavitation and/or the use of chemical reactions, particularly aided with a catalyst.

However, several of these existing methods are often limited in their effectiveness due to physical and/or spatial constraints. For example, hydrodynamic cavitation, which relies on the increase in fluid flow turbulence and occurrence of cavitation, or gas voids/bubbles, is often limited to decontaminating the specific localized areas where cavitation occurs. Thus, a significant portion of the fluid flow would need to be exposed to cavitation in order for effective decontamination to occur. Another example is the use of catalysts to initiate chemical reactions that destroy or modify such unwanted chemicals to render them safe. Often, a single or uniform type of catalyst is employed which may only be effective in targeting a fraction of the unwanted compounds.

It should therefore, be appreciated that there remains a need for effectively decontaminating liquids, including enhancing existing decontamination methods to improve the destruction of toxic species and other unwanted organic compounds. The present invention addresses this need and others.

SUMMARY OF THE INVENTION

Briefly, and in general terms, the invention provides a fluid decontamination apparatus that contains one or more three dimensionally open structured (3DOS) substrates to facilitate the destruction of toxic species and unwanted organic compounds contained in a contaminated fluid. The apparatus may include a body configured to introduce the contaminated fluid through one or more nozzles configured to induce turbulent flow, wherein the contaminated fluid contacts the one or more 3DOS substrates as it flows across the body prior to being discharged via an outlet. The 3DOS substrates can be porous and permeable, wherein the porosity enables extending the volume of fluid flow exposed to flow turbulence, further inducing cavitation and thereby promoting the degradation and/or alteration of the toxic species and unwanted organic chemicals. The 3DOS substrates are also configured to initiate chemical reactions on its exterior and interior surfaces. As such, the 3DOS substrates provide a means for enhancing the destruction of toxic species and unwanted organic compounds contained in a contaminated fluid.

In a detailed aspect of an exemplary embodiment, one or more inlet apertures are disposed about the body, wherein a corresponding nozzle can be inserted and secured within each of the said inlet apertures. Each nozzle is configured to spray the contaminated fluid in a manner that induces turbulent flow while being directed to impinge onto the interior and/or exterior surfaces of a respective 3DOS substrate. The nozzles can have nozzle openings oriented in any direction, such as parallel or orthogonal to the fluid flow through a 3DOS substrate, wherein the contaminated fluid is sprayed though said nozzle openings. The nozzles may also be of different configurations, orientations, size, and may also vary in number and location, so as to vary the spray projection as directed to the 3DOS substrates and optimize the decontamination of the contaminated fluid.

More specifically, in an exemplary embodiment, the 3DOS substrates can be composed of a metal alloy, such as FeCrAl, also known as fecralloy that includes the Kanthal® brand. The metal alloy can be configured as a metal foam or configured with similar characteristics as metal foam, such as high elasticity, tensile strength, and heat resistance. Such characteristics can also vary depending on any other fluid decontamination measures utilized. The 3DOS substrates can also be configured with prescribed levels of porosity, permeability, and tortuosity as a function of open pore sizes ranging from microns to millimeters, including open-ended and closed-ended pores, as seen with common metal and ceramic foams, wire meshes, and other reticulated material. The porosity can define a fluid flow path (flow pattern) within the 3DOS substrate that enables extending the volume of a fluid experiencing turbulent flow conditions, and thus increasing the exposure to hydrodynamic cavitation within the fluid, leading to further destruction of unwanted and toxic chemicals. The 3DOS substrates further provide active sites on its exterior and/or interior surfaces wherein chemical reactions can proceed, also leading to the destruction of unwanted and toxic chemicals. The 3DOS substrates can also be configured in a plurality of shapes and sizes, including a cylinder and/or conical-end cylinder, or in sheets shaped to accommodate the fluid flow from the nozzles.

In a detailed aspect of an exemplary embodiment, the 3DOS substrate can be configured as a metal foam with surfaces that are chemically modified to enable and enhance chemical reactions to take place on said surfaces, which will assist in the chemical destruction of the toxic chemicals in the fluid stream. Additionally, the foam material may be composed of any non-metallic materials, such as, but not limited to, ceramics, such as aluminum or silicon oxides, and may be reticulated carbon or quartz in open pore structures. Moreover, the surfaces of the substrates may be modified to specifically trap and remove toxic chemical species, as a result of chemical or physical interaction between the toxic species and the nature of the modified surface.

In another detailed aspect of an exemplary embodiment, the 3DOS substrates can be coated with catalysts to enhance the ability to initiate chemical reactions on its external and/or internal surfaces. Moreover, the 3DOS substrates can contain a selective catalyst system, where various types of catalysts are coated at different portions of a 3DOS substrate to promote and accelerate different chemical reactions that destroy or alter specific contaminants of a fluid. Furthermore, a 3DOS substrate coated with a catalyst at the inlet of the substrate, followed by a surface coated with material to enable absorption and/or adsorption of specific chemicals will maximize the removal of unwanted contaminants.

In yet another detailed aspect of an exemplary embodiment, the fluid decontamination apparatus can include a plurality of separate decontamination bodies that are sequentially coupled to each other, with each decontamination body comprising 1) an inlet nozzle configured to induce hydrodynamic cavitation, and 2) a 3DOS substrate section. As such, the volume of a contaminated fluid that is exposed to cavitation forming conditions is increased as the fluid flows through each decontamination body sequentially.

In yet another detailed aspect of an exemplary embodiment, the 3DOS substrates can comprise corrugated and/or smooth metal strips that are wound with or without a mandrel, providing a similar effect as previously described with the use of a metal alloy with metal foam characteristics. The metal strips can include corrugated metal strips placed at different angles (such as chevron corrugations), perforated corrugated metal strips, and different lengths of metal strips.

In yet another detailed aspect of an exemplary embodiment, the 3DOS substrates can comprise wire mesh wound in a cylinder or placed as a packed bed within a container body, providing a similar effect as previously described with the use of a metal foam or corrugated metal strips.

In yet another detailed aspect of an exemplary embodiment, the fluid decontamination apparatus can be used with a UV spectral irradiation reactor chamber, wherein the fluid flows through the reactor chamber, and is targeted by UV lights from germicidal UV lights. The reactor chamber can be quartz walled to enable the UV light to impinge upon the contaminated fluid. Moreover, the 3DOS substrates can be made of quartz material to enable the UV light to continue to impinge upon the contaminated fluid. The 3DOS substrates can be a packed bed of quartz beads or particles, or a plurality of quartz particles fused onto a quartz support strut, wherein either method extends the volume that a fluid is exposed in turbulent flow conditions.

In yet another detailed aspect of an exemplary embodiment, the system can be configured to decontaminate the fluid as it flows therethrough in a continuous flow or in a pulse flow. Embodiments can include (1) continuous flow, (2) pulse flow, or (3) both continuous flow and pulse flow.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
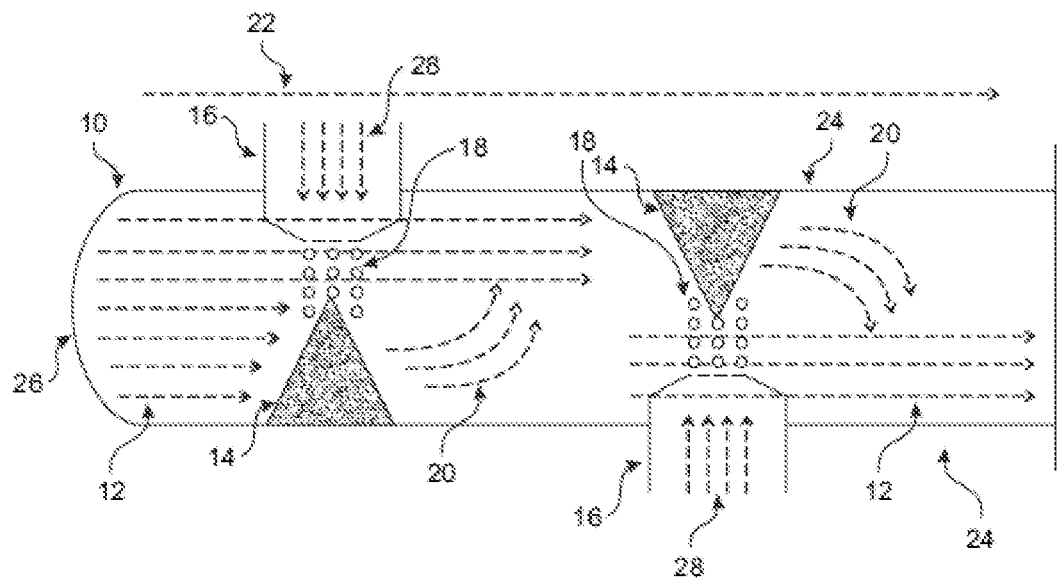
FIG. 1 is a side cutaway perspective view of a fluid decontamination apparatus in accordance with the present invention, depicting contaminated fluid entering a body through nozzles and contacting multiple 3DOS substrates.

Referring now to the drawings, and particularly FIG. 1, there is shown a fluid decontamination apparatus having a body 10 with a plurality of three-dimensional open structure (3DOS) substrates 14 spaced about therein, wherein a contaminated fluid flowing 12 through the body 10 will contact the 3DOS substrates 14. Nozzles 16 can be inserted and secured within inlet apertures disposed about the body 10 and configured to inject 28 the contaminated fluid with/without air to induce the occurrence of hydrodynamic cavitation 18. The substrates 14 can be porous and permeable, enabling the contaminated fluid to flow 12 therethrough, wherein the fluid flow passageway through the pores extends the volume of contaminated fluid exposed to turbulent and cavitation inducing flow conditions. Moreover, the 3DOS substrates 14 may be coated with one or more types of catalysts, wherein the interaction between the contaminated fluid and the porous surfaces can initiate chemical reactions. As such, the extended exposure of the contaminated fluid to the formation and implosion of gaseous voids from hydrodynamic cavitation, along with the chemical reactions carried out on the porous surfaces, enable an increased number of toxic species and unwanted organic compounds to be destroyed and/or altered, thereby enhancing the decontamination of the flowing fluid 12.

Figure 2:
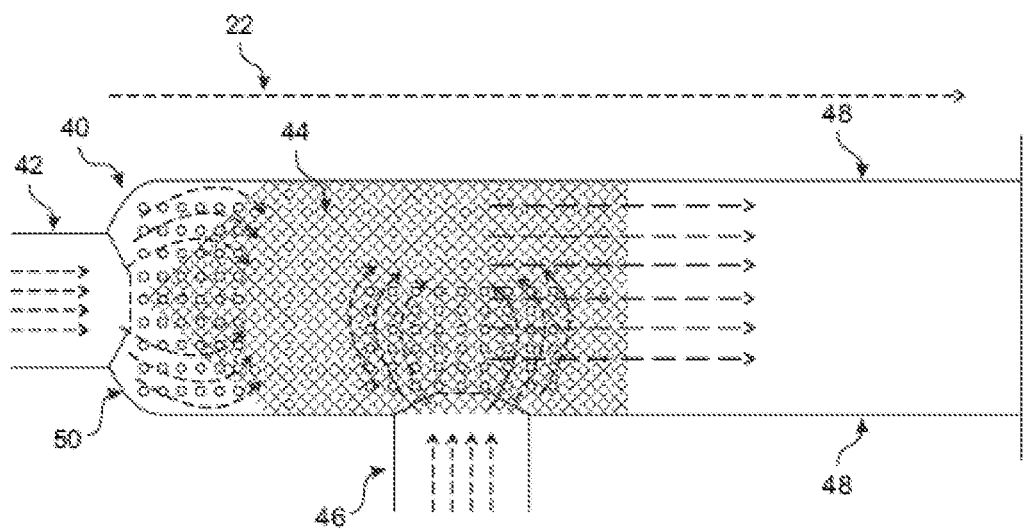
FIG. 2 is a side cutaway perspective view of a fluid decontamination apparatus in accordance with the present invention, depicting nozzles spraying contaminated fluid into a body in different orientations and impinging onto a 3DOS substrate that has a conical head with a cylindrical body.
Figure 3:
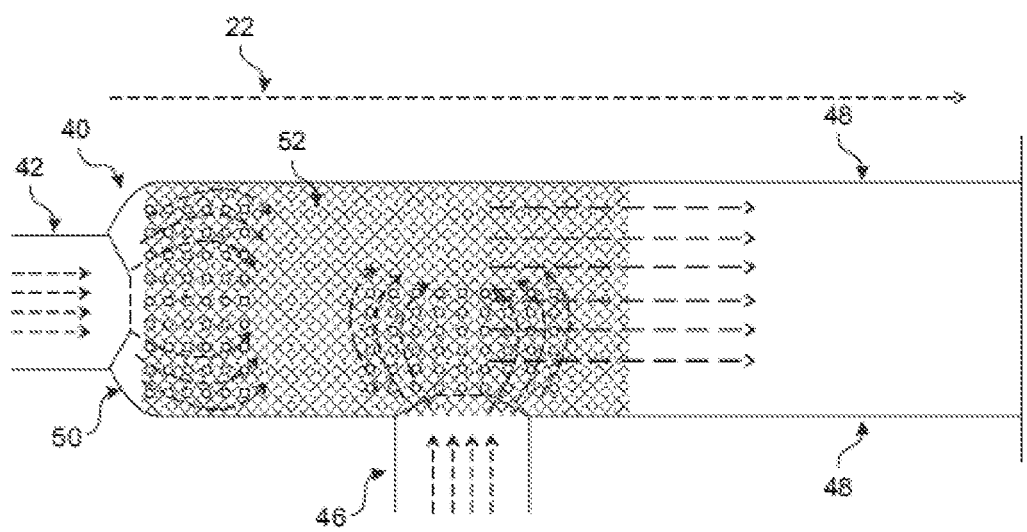
FIG. 3 is a side cutaway perspective view of a fluid decontamination apparatus in accordance with the present invention, depicting nozzles spraying contaminated fluid into a body in different orientations and impinging onto a 3DOS substrate that has a cylindrical body of uniform diameter.

With reference to FIGS. 1-3, the exemplary embodiments depict a body (10, 40), defining an enclosure that receives the contaminated fluid through one or more nozzles (16, 42, 46), which are inserted and secured within inlet apertures disposed about the respective body. Each nozzle defines a fluid flow passageway between the body (10, 40) and an external fluid source, such as a piping system. The contaminated fluid flows through the body (10, 40), with at least a portion of the fluid flowing through one or more three-dimensional open-structured substrates (14, 44, 52), prior to exiting the body through one or more outlets (e.g. FIG. 7 reference character 207). The net displacement of the fluid flow is in a direction parallel to a longitudinal axis (Ax) 22 of the body (10, 40). Each nozzle can be configured to spray the contaminated fluid in a uniform manner. In addition or alternatively, the actual fluid flow profile may also be non-uniform due to its turbulence.

In an exemplary embodiment, the fluid flow displacement is based on the location of the inlet aperture(s) (16, 42, 46) and outlet aperture(s) (not shown), wherein the fluid will flow from the inlet apertures to the outlet apertures. In addition, or alternatively, the flow of the contaminated fluid within the body can be continuous and/or pulsated flow. Furthermore, in addition or alternative embodiments, the inlet aperture(s) can be aligned or inserted with other means for receiving fluid, such as other types of pipe fittings. The body (10, 40) can include a longitudinal section (24, 48) that is parallel with the longitudinal axis 22 (Ax), and the body can further include opposing ends comprising of a first end (26, 50) and a second end (not shown). The body can be configured as a tubular shape, or any another shape.

Referring now to FIG. 1, the contaminated fluid is introduced within the body via injection nozzles 16 (inserted within a respective inlet aperture) that are disposed about the longitudinal section 24 of the container body 10. Each injection nozzle 16 comprises a nozzle opening that is oriented orthogonal to the longitudinal axis 22, and thereby configured to spray the contaminated fluid orthogonal to the fluid flow through 3DOS substrates 14 and the container body 10. Exemplary conditions for the fluid introduced within the container body include pressures ranging from 0.2 MPa to 0.55 MPa for a water flow rate between 3.5 liters/min to 5.0 liters/min.

By contrast, referring now to FIGS. 2 and 3, the body 40 includes a parallel spraying injection nozzle 42 disposed at one of the opposing sides 50, and an orthogonal spraying injection nozzle 46 disposed on the longitudinal section 48, wherein the 3DOS substrate(s) (44, 52) covers the cross-section of the body 40 and fluid passageway for a specified length across the respective longitudinal section 48. The 3DOS substrate in FIG. 2 (44) comprises a conical inlet portion, while the 3DOS substrate depicted in FIG. 3 (52) is a cylinder with a uniform diameter. The number and location of nozzles for either body (10, 40) can be varied so as to spray fluid towards and impinging upon the respective 3DOS substrate(s) in a manner that optimally decontaminates the contaminated fluid (further described below).

Moreover, the nozzle type and size can vary for each inlet aperture (16, 42, 46), thereby impacting the performance of a 3DOS substrate in decontaminating fluid. For example, Venturi nozzles can be used to promote fluid to be injected/dispersed with increased turbulence. Each nozzle can include a nozzle opening that can be slit, conical, or a similar shape such that the spray pattern can be altered, thereby impacting the fluid flow turbulence. As aforementioned, each nozzle opening can be structured such that the flow pattern of a fluid will be directed to a 3DOS substrate, enabling the fluid flow to impinge onto the exterior and/or interior surfaces of the 3DOS substrates, described further below. Moreover, each nozzle opening can be configured to spray the contaminated fluid such that it interacts uniformly over the inlet section of a respective 3DOS substrate. It should be appreciated that a given fluid decontamination apparatus may contain various combinations of such nozzle sizes, orientation, and inlet structures, in addition to any combination of the number and location of such nozzles, without departing from the invention.

Figure 4:
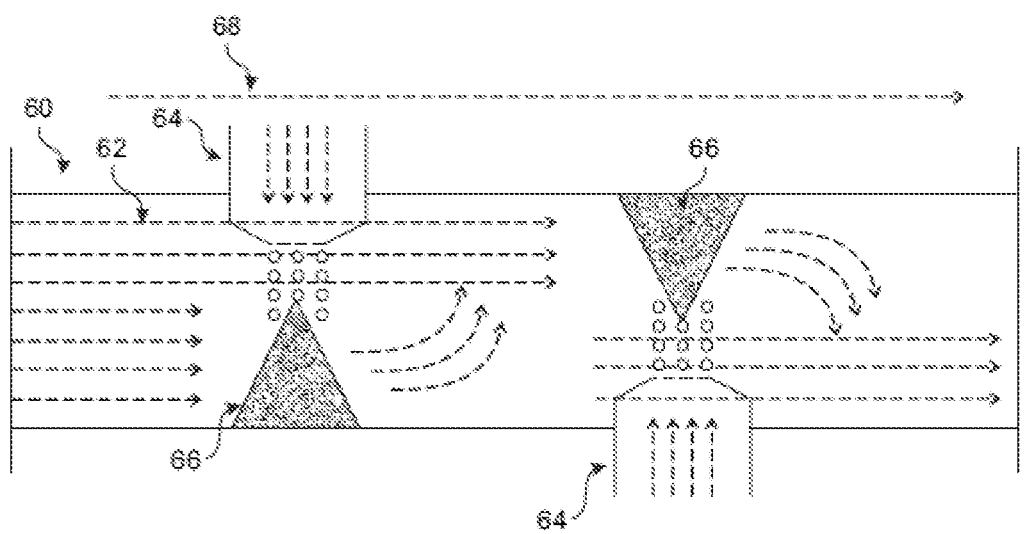
FIG. 4 is a side cutaway perspective view of a fluid decontamination apparatus in accordance with the present invention, depicting contaminated fluid flowing through a piping system and contacting 3DOS substrates, wherein nozzles have nozzle openings oriented in a direction orthogonal to the fluid flow direction.

Referring now to FIG. 4, in an alternate embodiment, a decontamination assembly can be included within a pipe section of a continuous pipe 60 with contaminated fluid flowing 62 within, with the pipe 60 defining a fluid flow path parallel with a longitudinal axis (Ay) 68. The decontamination assembly includes one or more 3DOS substrates 66 and inlets 64 configured with injection nozzles for increasing fluid turbulence, which can include injecting contaminated fluid and/or air at medium or high pressure.

With continued reference to FIGS. 1-4, the 3DOS substrate(s) (14, 44, 52, 66) can be composed of a rigid, porous material, wherein liquid interaction with the 3DOS substrate is increased based on the porosity. The open structure is a function of the void volume in the substrate, i.e., the total volume of void space occupied in a 3DOS substrate. In the exemplary embodiment, the 3DOS substrate is comprised of a metal alloy, such as FeCrAl, which is commercially available, e.g., under the Kanthal® brand. The metal alloy can be configured as a metal foam (e.g., metal sponge), or exhibit similar characteristics as seen in metal foams, such as high porosity, elasticity, tensile strength, and good heat resistance. In addition to or alternatively, the 3DOS substrate can be configured with a ceramic foam. Characteristics such as porosity, permeability, and tortuosity can be configured as a function of open pore sizes ranging from 5 microns to 5 millimeters. Moreover, the characteristics of a 3DOS substrate, including porosity, can be varied about the substrate, such as across its length, e.g., from inlet to exit.

In an alternate or additional embodiment, the foam material may be composed of any non-metallic materials, such as, but not limited to, ceramics, such as aluminum or silicon oxides, and/or may be reticulated carbon or quartz in open pore structures.

Figure 5:
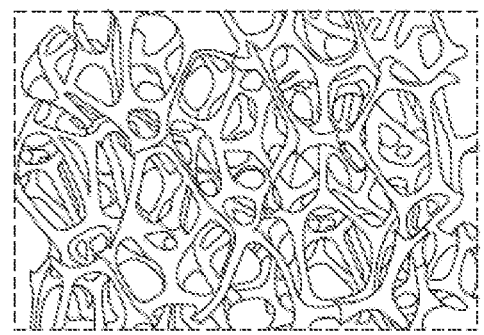
FIG. 5 depicts an open-cell foam structure with a random spatial configuration of the pores.
Figure 6:
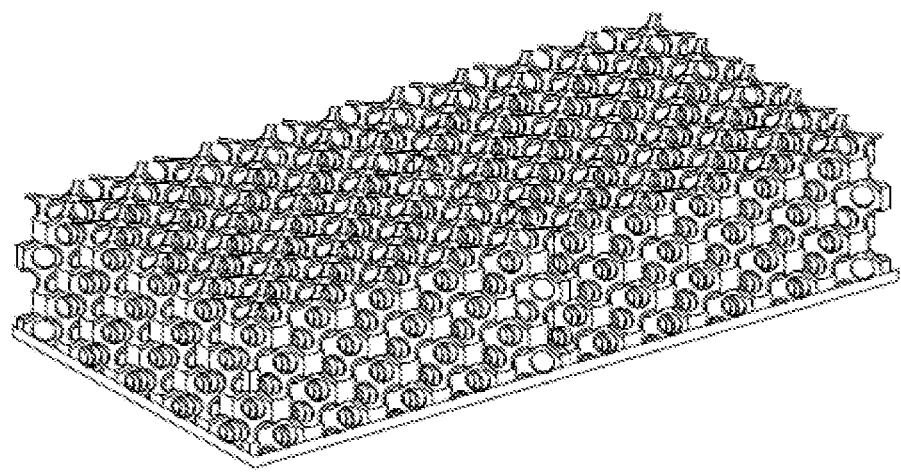
FIG. 6 depicts a 3DOS substrate embodied as a metal foam with an organized spatial configuration of the pores.

In an exemplary embodiment, the 3DOS substrate can employ open-cell pores, which consists of an interconnected network of pores within the metal body, enabling fluid to pass within and through said 3DOS substrate. In addition or alternatively, the cells may be partially obstructed, but not completely closed, thereby still enabling fluid to flow therein. Moreover, the cells may be disposed randomly within the 3DOS substrate (FIG. 5), or in an organized configuration (FIG. 6). The foam cells may include openness ranging from nominally 10 pores per inch (ppi) to 50 ppi, but may be as high as 100 ppi, depending on the choice of foam material and the inlet operating pressure. Furthermore, an exemplary range for the relative density of metal foams can be between 2% and 15% of the metal density making up the 3DOS structure. Metal oxide foam structures can be employed over a similar range for the relative ppi and density. Other exemplary ranges for relative density can include ceramic foams, ranging between 3% and 20%, and carbon foams, ranging between 3% and 4%. The relative density is the density of the of the 3DOS structure (with the specified porosity) divided by the density of the solid material making up the 3DOS structure (i.e. no pores). The porosity of a 3DOS structure can be determined based on the relative density.

The 3DOS structures may be further configured with open cell structures of varying shapes, from triangular to circular, thereby providing a means to control and/or direct the flow patterns through said 3DOS substrates that will enhance the ability to manifest the inlet hydrodynamic cavitation. As such, the contaminated fluid, in turbulent flow and incurring hydrodynamic cavitation formation, can be configured to pass through and exit the 3DOS substrate in a manner that extends the hydrodynamic cavitation throughout the 3DOS structure, due to the fluid flow patterns defined by the open structure within the 3DOS substrate. Thus, additional areas of reduced pressure are formed, further inducing hydrodynamic cavitation within the fluid to occur (described below). Moreover, the fluid flow pathways (patterns) within the 3DOS substrate increases the interaction between the fluid and substrate exterior and/or interior surfaces, thereby promoting chemical reactions and/or absorption/adsorption to occur on said exterior and/or interior surfaces (described below). As aforementioned, the interconnecting network of pores or reticulation can further be constructed with varying tortuosity and permeability, thereby affecting the length and extent of exposure of a contaminated fluid to the pores within a 3DOS substrate, which can be manipulated to enhance interaction with the substrate surfaces.

The 3DOS substrates can be of different shapes, sizes, and void fraction to enhance interaction between the contaminated fluid and substrate surfaces, and extend exposure of the fluid to turbulent and/or hydrodynamic inducing conditions. As aforementioned, the pore sizes for the 3DOS substrates may vary from microns to millimeters, wherein the specified size is based on the fluid velocity, viscosity, and inlet pressure of the fluid causing hydrodynamic cavitation at the inlet of the body. As aforementioned, exemplary inlet flow conditions can include 0.2 MPa to 0.55 MPa for a water flow rate between 3.5 liters/min to 5.0 liters/min, and the viscosity of a contaminated fluid can be similar to that of water (1 cP at 20° C.). The wall thickness of the 3DOS substrate can be defined based on the specified pores per inch (ppi) and density of the interconnecting pores, wherein such specifications also impact the size and porosity (void fraction) of a given substrate. Moreover, the porosity of a given 3DOS substrate can vary across its length, such as increasing, decreasing or varying non-uniformly across the 3DOS substrate, so as to manipulate the degree of turbulence and/or number of active sites for chemical reactions to proceed thereon, e.g., increasing the turbulence and number of active sites. Such varying porosity can be accomplished by varying the cell configuration and foam compositions, which can be manufactured by different methods, thereby introducing variations in pore size range and relative densities.

As aforementioned, the structure of the 3DOS substrate can be a cylinder with a uniform diameter, as seen in FIG. 3 (52). As another example, the structure of 3DOS substrate can be conical on one end, as seen in FIGS. 1, 2, and 4 (14, 44, 66). The reactor (body) could also contain sheets of the 3DOS substrate if a body (reactor) design other than cylindrical were employed. It should be appreciated that the structure of the 3DOS substrate can be in any shape that promotes hydrodynamic cavitation and fluid flow turbulence supporting decontamination. Moreover, the 3DOS substrate can be configured to limit the backpressure developed for the fluid flowing therethrough, so as to ensure there remains a minimum driving force (pressure differential) for 1) the fluid to flow at a certain flow rate and 2) to induce formation of hydrodynamic cavitation within the fluid.

As aforementioned, the 3DOS substrate can aid to extend the volume of fluid exposed to hydrodynamic cavitation formation conditions. Hydrodynamic cavitation is the formation, growth, and subsequent collapse of microbubbles in a fluid that results in a large amount of energy released per volume within milliseconds. The formation of such microbubbles, or gas voids, within a fluid, can be induced by a localized reduced pressure point. With reference to the 3DOS substrate, the combined action of the velocity of the fluid over the substrate walls within the 3DOS substrate results in a pressure drop on the downstream side of said walls due to the drag of the fluid flow over the respective surface, thereby resulting in cavitation formation. The subsequent increase in surrounding pressure results in the implosion of such gas voids, (i.e. collapsed microbubbles) which can result in localized pressures and temperatures ranging (but not limited to) from 10 MPA to 500 MPa and 1000K to 10,000K respectively. As a result of the collapsed microbubble conditions, unique chemical reactions can take place that can alter and/or destroy toxic species and/or unwanted organic compounds. The chemical reactions can take place, in part, due to radicals formed from the fluid, e.g. water, and/or due to the trace chemicals dissolved in the fluid (e.g. water).

Figure 19:
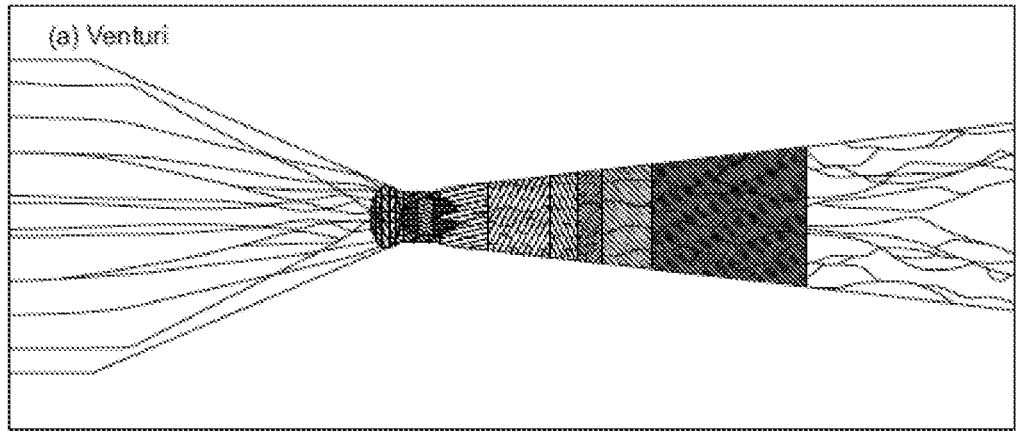
FIG. 19 is a depiction of fluid flow through a venturi nozzle, depicting cavitation bubble paths or trajectories overlapped over the resulting pressure contours.
Figure 20:
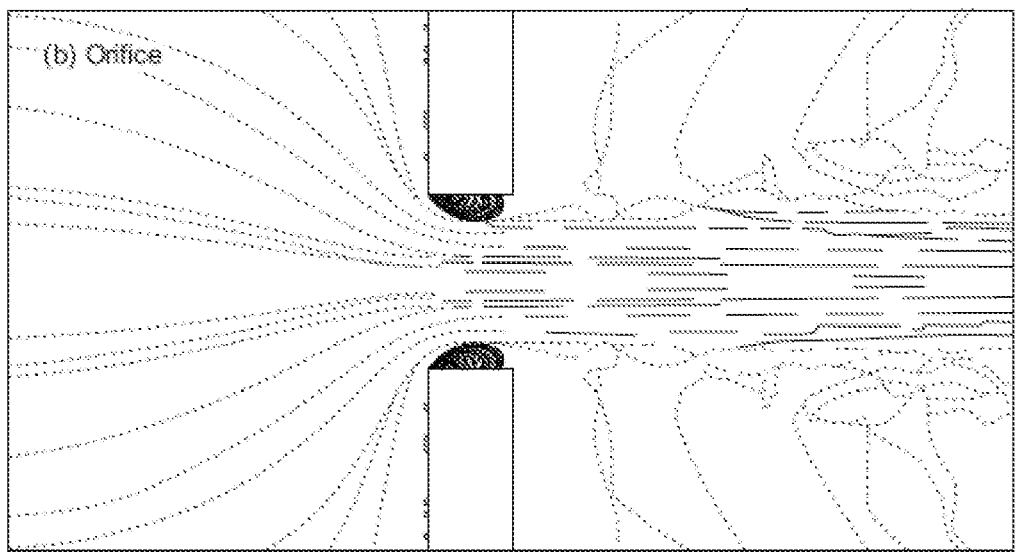
FIG. 20 is a depiction of fluid flow through an orifice, depicting cavitation bubble paths or trajectories overlapped over the resultant pressure contours.

With reference to FIGS. 19 and 20, there is shown a depiction of the cavitation bubble paths or trajectories overlapped over the pressure contours in a venturi nozzle (FIG. 19) and through an orifice respectively (FIG. 20). As depicted in FIG. 19, fluid flow through a venturi nozzle results in a larger cross-sectional area exposed to a low-pressure region, where as fluid flow through an orifice (FIG. 20) produces a low-pressure region about the orifice holes.

The effectiveness of decontaminating a fluid using hydrodynamic cavitation depends on the extent of fluid volume exposed to sufficiently turbulent conditions. As such, the use of a 3DOS substrate will extend the volume of fluid exposed to such turbulent conditions based on 1) the interconnected voids contained within the substrate and 2) the semi barrier that the 3DOS substrate as a whole presents to the fluid flow, thereby extending the cavitation forming conditions created by the inlet nozzle. Continued cavitation may also occur within the 3DOS substrate, depending on the flow velocity and the 3DOS substrate walls/structure within the flow path.

Figure 7:
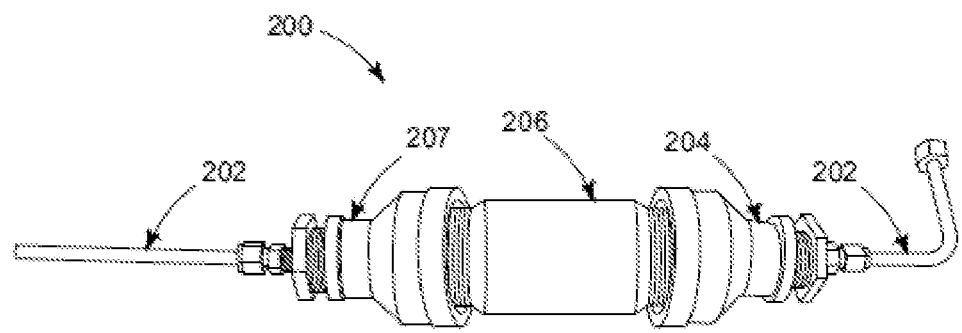
FIG. 7 depicts a fluid decontamination apparatus in accordance with the present invention, depicting an inlet section and 3DOS substrate section, and connected piping.

Referring now to FIG. 7, an exemplary decontamination apparatus 200 is depicted connected with a piping system 202 and configured to conduct experimental tests for evaluating the effectiveness of using 3DOS substrate(s) for fluid decontamination. The apparatus 200 comprises a 2" inlet section 204 that includes a nozzle (not shown) configured to induce hydrodynamic cavitation within the fluid, and a larger 4" section 206 that is configured to contain a 3DOS substrate within. The pipe 202 connected to the apparatus is ¼ inch. In the exemplary experimental tests, the fluid flowing through the pipe 202 and apparatus 200 is a water solution of four halogenated hydrocarbons. The water is introduced through the inlet nozzle 204 at a rate of 500 gpd and pressure of 0.00527 MPa. The experimental tests evaluated the decontamination of the water solution achieved by 1) using only hydrodynamic cavitation, induced by the inlet nozzle, wherein the fluid did not encounter a 3DOS substrate, and 2) inducing hydrodynamic cavitation and subsequently flowing the fluid through a 3DOS substrate section, which comprises of a FeCrAl foam structure with approximately 50 ppi. The results from the experimental test are below:

Hydrodynamic Cavitation Only (Via Nozzle)
(without 3DOS Substrate)

|  |  | Before µg/L | After µg/L |
|---|---|---|---|
| Bromodichloromethane | Lower Concentration | 150 | ND (non-detectable) |
|  | Higher Concentration | 630 | 10 |
| Bromoform | Lower Concentration | 170 | 20 |
|  | Higher Concentration | 680 | 77 |
| Chloroform | Lower Concentration | 130 | 81 |
|  | Higher Concentration | 550 | 390 |
| Dibromochloromethane | Lower Concentration | 170 | 3 |
|  | Higher Concentration | 700 | 14 |

Hydrodynamic Cavitation (Via Nozzle) with 3DOS Substrate

|  |  | Before µg/L | After µg/L |
|---|---|---|---|
| Bromodichloromethane | Lower Concentration | 130 | ND |
|  | Higher Concentration | 510 | ND |
| Bromoform | Lower Concentration | 130 | ND |
|  | Higher Concentration | 520 | ND |
| Chloroform | Lower Concentration | 110 | 1.9 |
|  | Higher Concentration | 430 | 17 |
| Dibromochloromethane | Lower Concentration | 140 | ND |
|  | Higher Concentration | 590 | ND |

The test results indicate an increased reduction in contaminant concentration when inducing hydrodynamic cavitation within the fluid (via the inlet nozzle) and subsequently flowing the fluid through the 3DOS substrate section. Specifically, as seen in the test results, significant reduction in each halogenated contaminant results from the combined hydrodynamic cavitation and a Fecralloy foam that the hydrodynamic cavitation without the Fecralloy foam is incapable of producing. The contribution exhibited by the addition of the foam can be provided by any of several structures which have multiple voids or open spaces such as are found in reticulated shapes i.e., foams, or in perforated material, or in meshed material, through which fluids may flow with low pressure drop or similar pressure differential from inlet to exit and experience hydrodynamic cavitation as demonstrated in the above experiment. As such, the test results provide support for improved decontamination of fluids by extending the exposure of turbulence, and thereby cavitation formation, when flowing such fluids in turbulent flow and pressure differentials across one or more 3DOS substrates.

Figure 8:
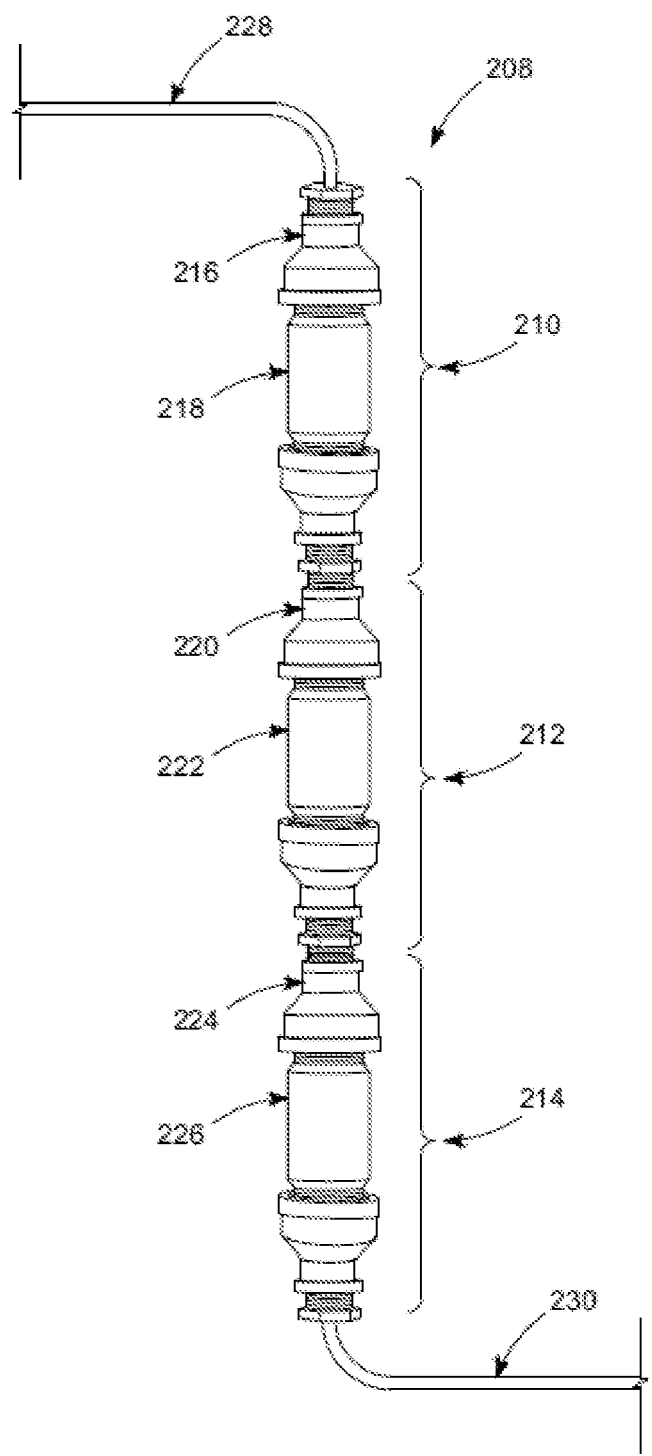
FIG. 8 depicts a fluid decontamination apparatus in accordance with the present invention, depicting a plurality of decontamination bodies arranged sequentially, each decontamination body including an inlet section and 3DOS substrate section.
Figure 9:
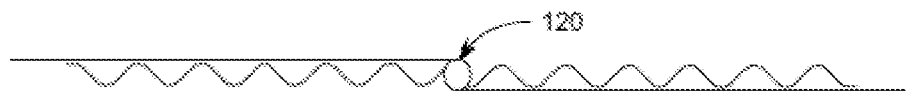
FIG. 9 depicts a perforated corrugated metal strip that is attached to a mandrel when being wound.
Figure 10:
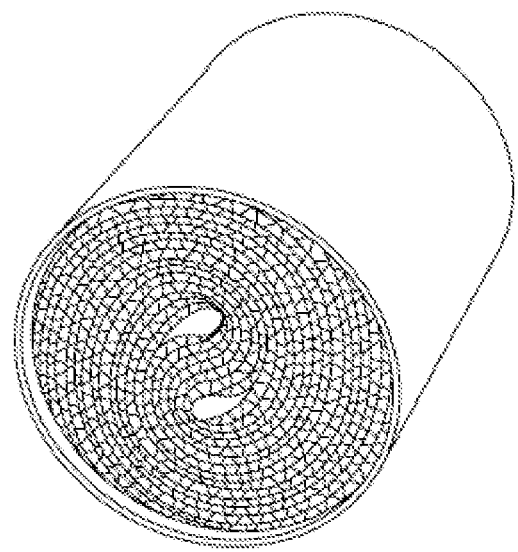
FIG. 10 depicts corrugated metals strips wound in a cylindrical manner without a mandrel.
Figure 11:
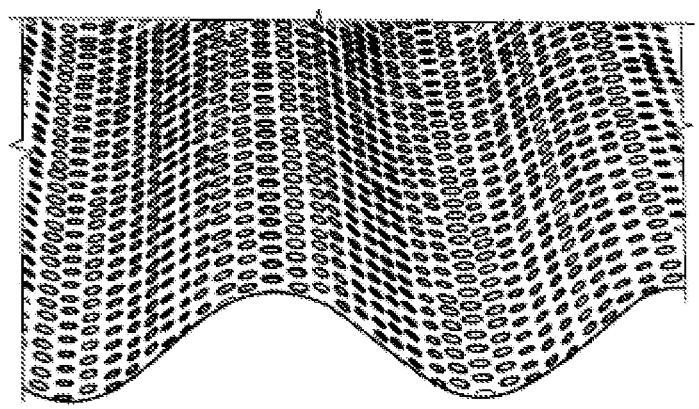
FIG. 11 depicts a perforated corrugated metal strip that can be combined in layers and wound with or without a mandrel.
Figure 12:
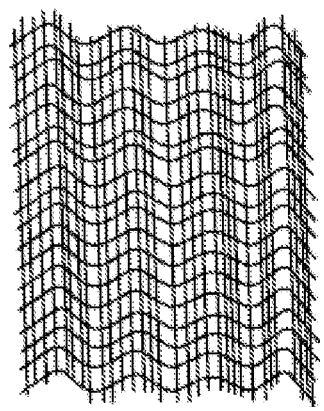
FIG. 12 depicts a corrugated metal strip that can be combined in layers and wound with or without a mandrel.
Figure 13:
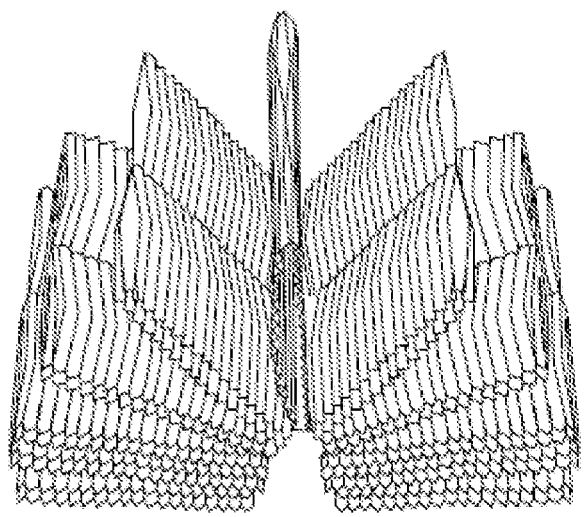
FIG. 13 depicts a perforated corrugated metal strip, wherein the corrugations are aligned in an angled chevron manner, and such metals strips can be combined in layers, and wound with or without a mandrel.

Referring now to FIG. 8, in an additional or alternate embodiment, a fluid decontamination apparatus 208 can comprise of a plurality of separate decontamination bodies (210, 212, 214) coupled to one another in a sequential manner. The first (210) and last (214) sequential bodies can be connected to a fluid containment system, such as a piping system (228, 230), while the connection between each pair of sequential bodies forms a fluid path to flow therethrough. Each decontamination body (210, 212, 214) can include an inlet (216, 220, 224) having a nozzle (not shown) that is configured to induce hydrodynamic cavitation within the fluid as it enters a respective decontamination body. Moreover, each decontamination body (210, 212, 214) can include a 3DOS substrate section (218, 222, 226) that encounters the fluid as it flows through the respective decontamination body. As such, sequentially arranging such decontamination bodies (210, 212, 214) further extends the volume of fluid exposed to cavitation forming conditions, and thereby enhances the decontamination of the fluid. As depicted in FIG. 8, a fluid flowing through a piping system 228 enters a first decontamination body 210 via a first inlet 216 nozzle, wherein cavitation formation is induced by the first nozzle and extended across the fluid as it flows through a first 3DOS substrate section 218. The fluid exits the first decontamination body 210 and flows through a second (212) and third (214) decontamination body sequentially, each decontamination body inducing cavitation formation via the respective inlet (220, 224) nozzle, and extending such cavitation forming conditions within the fluid via the respective 3DOS substrate section (222, 226). The fluid enters a piping system 230 after exiting the third decontamination body 214.

With continued reference to FIG. 8, the inlet nozzles can be configured to spray the fluid in an evenly distributed manner that induces cavitation formation within the fluid, and evenly distributes the fluid across the respective 3DOS substrate(s). This may be achieved by any of several methods which will produce hydrodynamic cavitation, two examples of which are shown in FIGS. 19-20. Additionally, the pressure of the fluid in the piping system prior to entering the first decontamination body is high enough to account for the pressure drop across all the decontamination bodies and meet the minimum required pressure at the discharge of the decontamination apparatus 208 (i.e. pressure in the piping system downstream the last sequential decontamination body). Pressure losses across each decontamination body can include the pressure drop as the fluid flows through the respective inlet nozzle, and the pressure drop across the respective 3DOS substrate.

In an additional or alternative embodiment, the 3DOS substrate can aid in providing additional active sites that enable unwanted chemicals to undergo chemical reactions and be either destroyed or altered in the process. Examples of such reactions include catalytic reactions, i.e. chemical reactions that are accelerated through catalysts coated onto the substrate. Moreover, the 3DOS substrate can employ a selective catalyst system where different types of catalysts are applied to different areas of a given substrate. This enables a given 3DOS substrate to specifically target the unwanted toxic species and/or organic compounds that are either unharmed or remain toxic from an earlier reaction by a given type of catalyst. For example, one type of catalyst may be coated on a 3DOS substrate to initiate chemical reactions at the inlet of the substrate, while a different type of catalyst will be coated at the other end of the same 3DOS substrate to initiate a different set of chemical reactions for the remaining, or resulting, unwanted chemicals and compounds.

Examples of such catalysts/material that can be coated or sprayed (or bound) on the surface of the 3DOS substrates include oxides, such as perovskite, alumina, and/or similar material, which can act as an active surface on which unwanted or toxic species may require a lower energy for activation (for a chemical reaction) or result in adsorption/absorption, and further enhances the interaction of the unwanted/toxic species. Additional catalyst examples would include the application of catalytic species, such as noble or non-noble metal species, onto the coated surfaces, wherein the coated surfaces maybe alumina or similar catalyst support material. In addition or alternatively, an oxide or similar material can be coated or sprayed (or bound) on the surface of the substrates to act as a surface on which a catalyst may be incorporated to lower the energy for activation, while another material may be sprayed or coated to enhance the activity of a catalyst. An example of a reaction taking place on a modified metal foam surface 3DOS substrate could be an oxidation reaction between an oxide surface, dissolved oxygen, and/or toxic hydrocarbon that is similar to any catalytic hydrocarbon oxidation process.

In yet another embodiment, only the inlet of a given 3DOS substrate may be applied with catalysts to accelerate chemical reactions. The remaining surface of the given substrate may instead be coated or treated with material that will absorb or adsorb the species and/or compounds generated at the catalytic sites, so as to complete the removal process of the unwanted toxic species and/or organic compounds. Zeolites and metalorganic framework (MOF) chemicals are examples of materials that can be coated on the substrate that will aid in such absorption and/or adsorption.

It should be appreciated that the use of 3DOS substrates can be used with any combination of existing fluid decontamination methods. For example, 3DOS substrates can be used where hydrodynamic cavitation, sonication, catalytic reactions, and absorption/adsorption are all used together.

In an alternate or additional embodiment, injection nozzles for each inlet can be configured to increase the fluid flow turbulence by injecting the contaminated fluid with air at medium or high pressure, thereby resulting in droplets, voids, and/or regions of varying pressure that impinge onto each 3DOS substrate surface. Including air in the inlet nozzle as it sprays contaminated fluid aids in incorporating areas of voids within the 3DOS substrate as the fluid flows therethrough. As such, by increasing the fluid flow turbulence, such injection nozzles enable to 1) induce hydrodynamic cavitation formation by spraying directly onto the 3DOS substrate, and 2) increase interaction between the contaminated fluid and 3DOS substrates to enable chemical reactions involving unwanted chemicals to be carried out. Air can be received from an external air supply and injected into the liquid feed stream.

With reference to FIGS. 9-13, use of corrugated metal structures, created by any of several methods including, but not limited to, winding corrugated and/or smooth strips of metal, may also be employed, either in place of metal alloys configured as metal foam, or in conjunction with such metal foams. Likewise, emplacement of a monolith, which incorporates a series of wound corrugated and/or smooth metal strips, may be employed in place of metal foam, to serve much the same purpose that metal foam has been described previously to provide. The monolith can be wound with a mandrel 120 (FIG. 9), or without (FIG. 10), and can be wound to a given dimension that matches the inside container body or pipe diameter (similar to the 3DOS substrate (52) depicted in FIG. 3). Moreover, the metal strips can be wound along a mandrel or unit center in different configurations, such as corrugations from the different metal strips aligned at opposite angles, metal strips of varying lengths, and/or using strips of alternating length/angle. Types of metal strips that can be wound include layers of corrugated (FIG. 12) or similarly deformed metal strips, layers of perforated corrugated metal strips (FIG. 11), and/or layers in which the corrugations or deformations do not nest together i.e. the corrugations/deformations do not collapse together and thereby retain the original open structure desired (between the metal strip layers), such that smooth metal strips may not be needed. Moreover, the use of metal strips corrugated at angles, such as in the shape of a chevron (FIG. 13) or herringbone, may be employed with the perforations either randomly or uniformly in place, or can vary within a section of the sheet. In an alternative embodiment, the corrugated and/or angled corrugated metal strips may be layered on top of each other instead of being wound around a mandrel, wherein the strips are layered without nesting. The angle of corrugation can be varied to correspond to varying pores per inch (ppi), i.e. from large ppi to small ppi. The treatment of the corrugated metal monolith surfaces to retain the properties previously described for metal foam, including catalytic and adsorption/absorption surfaces, may be employed. Moreover, any combination of the aforementioned use of corrugated and/or smooth metal strips, varying angles, metal strip lengths, etc. can be used to manipulate the degree of decontamination attained. In any case, where foam or layered strips are employed, the entire cross-section of the body (reactor) is completely exposed to the 3DOS substrate to eliminate any possible by-pass of the flowing liquid from not flowing through the 3DOS substrate.

Furthermore, an alternative to metal strips may be the use of wire mesh than can also be wound into cylinders that take various shapes and configurations that result in tumultuous flow into, and through, the bed in similar fashion to the flow through a metal foam. Alternatively, the wire mesh can be implemented to form a packed bed of wire mesh to provide the desired three dimensionally open structure. Likewise, these surfaces may be altered in similar fashion as described for metal foam surfaces and metal strips to enhance catalytic and adsorption/absorption properties, including varying features over a length of a given section.

Figure 14:
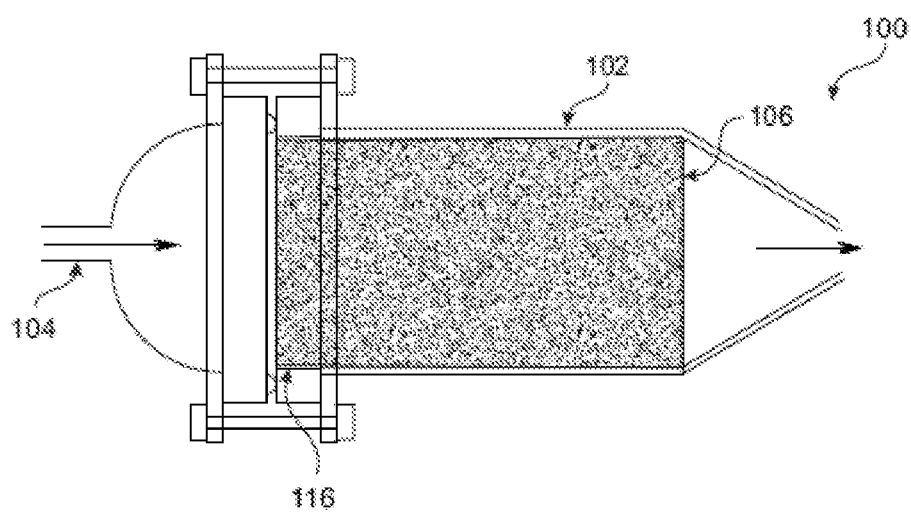
FIG. 14 is a side cutaway perspective view of a UV reactor chamber for fluid decontamination, comprising an inlet orifice or venturi for spraying the contaminated fluid in a turbulent manner across a 3DOS substrate.

With reference now to FIG. 14, an alternative embodiment is depicted of a fluid decontamination apparatus in accordance with the present invention, which include a reactor chamber 100 and a 3DOS substrate 106 disposed within a section of the reactor chamber 100. The reactor can comprise of metal and/or an ultraviolet (UV) transparent material, e.g. quartz 102. The use of quartz 102 for both the reactor chamber and the substrate enables UV spectral irradiation to be exposed to the fluid flow therein, wherein lamps/source of UV can be located external to and surrounding the reactor. As such, the entire outer surface of the quartz reactor is exposed to UV radiation.

Figure 17:
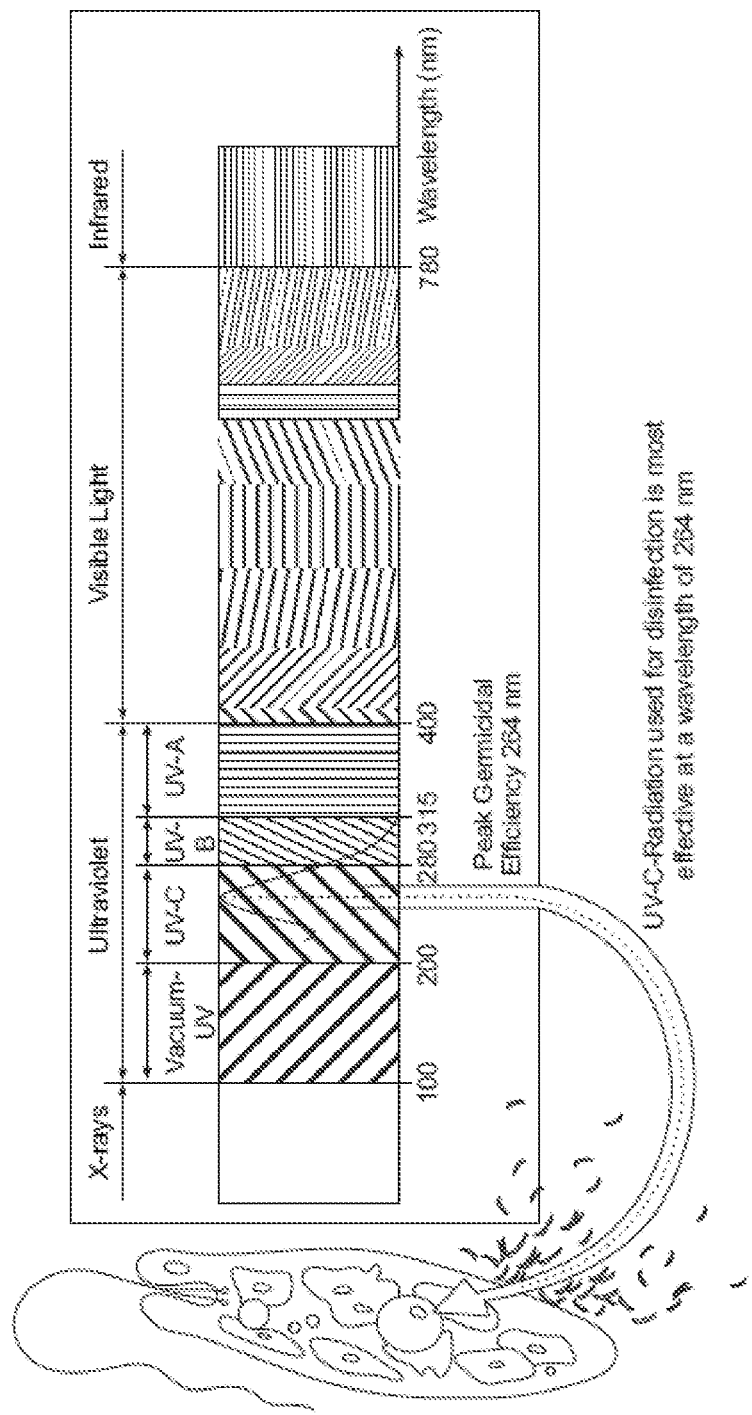
FIG. 17 depicts an optimal UV light wavelength in a spectrum for destroying unwanted biological compounds and species in a contaminated fluid.
Figure 18:
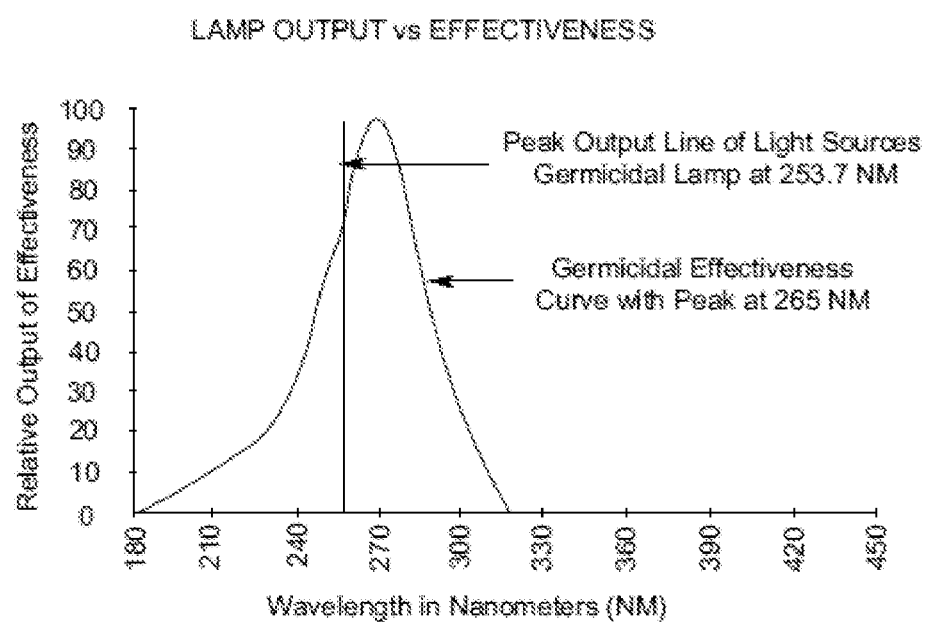
FIG. 18 depicts a graphical representation of germicidal effectiveness against UV wavelength, indicating the peak effectiveness.

Exposing fluid to UV spectral irradiation may be desired to destroy biological species and/or very stable organic compounds found in the fluid. Ranges of UV wavelengths for effectively destroying such biological species and/or stable organic compounds are depicted in FIGS. 17 and 18. Such UV spectral irradiation can be achieved by use of a quartz-walled reactor that will permit unobstructed UV light from germicidal UV lights to penetrate the flowing fluid.

Figure 15:
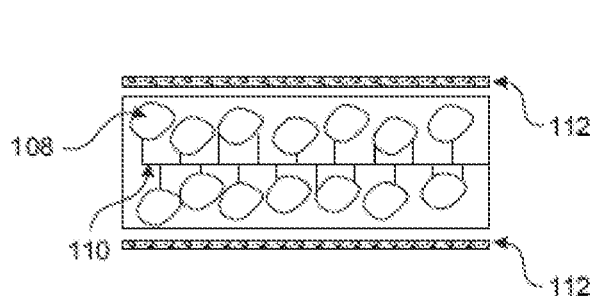
FIG. 15 is a side-cutaway view of the fluid decontamination apparatus of FIG. 14, depicting a 3DOS substrate comprising quartz particles attached to a quartz strut, with UV lamps disposed about the reactor chamber.
Figure 16:
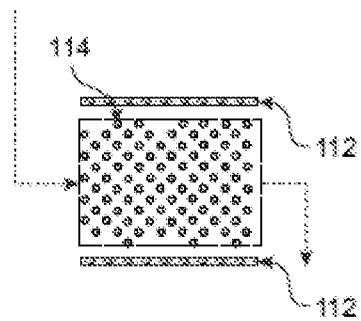
FIG. 16 is a side-cutaway view of the fluid decontamination apparatus of FIG. 14, depicting a 3DOS substrate comprising quartz particles or beads arranged in a packed bed manner, with germicidal UV lights disposed about the reactor chamber.

By combining the cavitation process (from injecting fluid in a turbulent manner) in conjunction with a 3DOS substrate, in the presence of UV light, the completion of the destruction of these unwanted materials can be achieved. However, because of the desire to permit the UV light to penetrate into and throughout the fluid as it passes through the 3DOS structures, as aforementioned, the material selection for said 3DOS will be quartz, rather than the material selection presented above (such as metal alloy). Referring now to FIGS. 15-16, the quartz 3DOS can take the form of either 1) a packed bed of quartz particles 114 (FIG. 16), such as beads, shards or pellets, or 2) the implementation of a structure 110 which rigidly holds quartz particles 108 in a fixed position (FIG. 15). Either approach will serve the same purpose of combining the enhancement of cavitation, a tortuous fluid flow path, and continuous exposure to UV light by germicidal UV lights 112. Moreover, in either approach, the quartz 3DOS can include a porous structure. Referring now to FIG. 14, the quartz 3DOS structures can be configured to fit 116 within grooves in endplates for respective O-ring gaskets within the reactor, and aligned with the inlet orifice or venturi 104 enabling hydrodynamic cavitation at the entrance of the reactor.

It should be appreciated from the foregoing that the present invention provides a fluid decontamination apparatus having a body with a plurality of three-dimensional open structure (3DOS) substrates spaced about therein, wherein a contaminated fluid flowing through the body will contact the 3DOS substrates. Nozzles can be inserted and secured within inlet apertures disposed about the body and configured to inject the contaminated fluid with/without air to induce the occurrence of hydrodynamic cavitation. The substrates can be porous and permeable, enabling the contaminated fluid to flow therethrough, wherein the fluid flow passageway through the pores extends the volume of contaminated fluid exposed to turbulent and cavitation inducing flow conditions. Moreover, the 3DOS substrates may be coated with one or more types of catalysts, wherein the interaction between the contaminated fluid and the porous surfaces can initiate chemical reactions. As such, the extended exposure of the contaminated fluid to the formation and implosion of gaseous voids from hydrodynamic cavitation, along with the chemical reactions carried out on the porous surfaces, enable an increased number of toxic species and unwanted organic compounds to be destroyed and/or altered, thereby enhancing the decontamination of the flowing fluid.

The present invention has been described above in terms of presently preferred embodiments so that an understanding of the present invention can be conveyed. However, there are other embodiments not specifically described herein for which the present invention is applicable. Therefore, the present invention should not be seen as limited to the forms shown, which is to be considered illustrative rather than restrictive.

Although the invention has been disclosed in detail with reference only to the exemplary embodiments, those skilled in the art will appreciate that various other embodiments can be provided without departing from the scope of the invention, to include any and all combination of features discussed herein.

What is claimed is:

1. A fluid decontamination apparatus, comprising:
   a body defining an enclosure that enables fluid flow therethrough, the body having opposing ends;
   an inlet aperture coupled to a contaminated fluid source and coupled to the body for introducing a fluid flow into the enclosure, the inlet aperture configured to generate hydrodynamic cavitation upon exiting the inlet aperture within the enclosure;
   a three dimensionally open structured (3DOS) substrate disposed within the enclosure proximate to the inlet aperture such that the hydrodynamic cavitation generated by the inlet aperture enters the 3DOS substrate and extends therein, the 3DOS substrate is structured such that the hydrodynamic cavitation is maintained and hydrodynamic cavitation continues through the 3DOS substrate, to enable destruction of toxic species and unwanted organic compounds contained in the contaminated fluid; and
   an outlet aperture for discharging the fluid flow from the enclosure, the inlet and the outlet apertures configured to direct the fluid flow through the enclosure.

2. The fluid decontamination apparatus as defined in claim 1, wherein the fluid flow is introduced within the body at pressures ranging from 0.2 MPa to 0.55 MPa for a water flow rate between 3.5 liters/min to 5.0 liters/min.

3. The fluid decontamination apparatus as defined in claim 1, wherein the 3DOS substrate is configured such that the hydrodynamic cavitation extended therein, results in localized pressure between 10 to 500 MPa and localized temperature between 1000 to 10,000K.

4. The fluid decontamination apparatus as defined in claim 1, wherein the inlet aperture is a Venturi nozzle.

5. The fluid decontamination apparatus as defined in claim 1, wherein the inlet aperture is coupled to a first opposing end of the body and having a nozzle opening oriented aligned with the fluid flow direction.

6. The fluid decontamination apparatus as defined in claim 1, further comprising a second inlet aperture coupled to the body and having a nozzle opening oriented orthogonal to the fluid flow direction, the second inlet aperture configured to generate hydrodynamic cavitation and positioned such that the hydrodynamic cavitation enters the 3DOS substrate and is maintained therein.

7. The fluid decontamination apparatus as defined in claim 6, further comprising a plurality of inlet apertures coupled to the body, each having a nozzle opening oriented orthogonal to the fluid flow direction, each of the plurality of inlet apertures are configured to generate hydrodynamic cavitation and positioned such that the hydrodynamic cavitation enters the 3DOS substrate and is maintained therein.

8. The fluid decontamination apparatus as defined in claim 1, wherein the inlet aperture is coupled to an air supply, to enable the fluid flow to be introduced within the enclosure with air to enhance hydrodynamic cavitation formation upon exiting the inlet aperture within the enclosure.

9. The fluid decontamination apparatus as defined in claim 1, wherein the 3DOS substrate is comprised of a metal alloy configured as a metal foam having a relative density between 2 percent and 15 percent.

10. The fluid decontamination apparatus as defined in claim 1, wherein the 3DOS substrate is comprised of corrugated metal structures.

11. The fluid decontamination apparatus as defined in claim 1 wherein the 3DOS substrate is comprised of a carbon foam having a relative density between 3 percent and 4 percent.

12. The fluid decontamination apparatus as defined in claim 1 wherein the 3DOS substrate is comprised of a ceramic foam having a relative density between 3 percent and 20 percent.

13. The fluid decontamination apparatus as defined in claim 1, wherein the 3DOS substrate defines a plurality of sections, each configured with different openness and relative densities from each other.

14. The fluid decontamination apparatus as defined in claim 1, wherein the 3DOS substrate defines a porous surface that is coated with a catalyst, to initiate chemical reactions that enable destruction of toxic species and unwanted organic compounds contained in the contaminated fluid.

15. The fluid decontamination apparatus as defined in claim 1, wherein the inlet and outlet apertures are coupled to and aligned with a piping system to form a continuous pipe section.

16. The fluid decontamination apparatus as defined in claim 1, wherein:
    the body comprises of quartz material to enable a germicidal UV light disposed about the body to impinge UV irradiation onto the fluid flow; and
    the 3DOS substrate comprises of quartz material, to enable the germicidal UV light to impinge UV irradiation onto the fluid flow.

17. A method of fluid decontamination, comprising:
    introducing, via an inlet aperture, a contaminated fluid from a fluid source into an enclosure, the inlet aperture being coupled to a body defining the enclosure that enables fluid flow therethrough;
    generating hydrodynamic cavitation upon exiting the inlet aperture within the enclosure;
    extending the hydrodynamic cavitation within a three dimensionally open structured (3DOS) substrate disposed within the enclosure, the 3DOS structure is positioned proximate to the inlet aperture such that the hydrodynamic cavitation generated by the inlet aperture enters the 3DOS substrate and the 3DOS substrate maintains the hydrodynamic cavitation of the fluid flow into the 3DOS substrate to enable destruction of toxic species and unwanted organic compounds contained in the contaminated fluid; and
    discharging the fluid flow from the enclosure via an outlet aperture, the inlet and the outlet apertures configured to direct the fluid flow across the enclosure.

18. The method as defined in claim 17, wherein the fluid flow is introduced within the body at pressures ranging from 0.2 MPa to 0.55 MPa for a water flow rate between 3.5 liters/min. to 5.0 liters/min.

19. The method as defined in claim 17, wherein the 3DOS substrate defines a porous surface that is coated with a catalyst, to initiate chemical reactions that enable destruction of toxic species and unwanted organic compounds contained in the contaminated fluid.

20. The method as defined in claim 17, wherein the body is coupled to a second inlet aperture having a nozzle opening oriented orthogonal to the fluid flow direction, the second inlet aperture configured to generate hydrodynamic cavitation and positioned such that the hydrodynamic cavitation enters the 3DOS substrate and is maintained therein.

* * * * *